United States Patent
Huang

(10) Patent No.: US 9,658,606 B2
(45) Date of Patent: May 23, 2017

(54) PROTECTION CIRCUIT TO PREVENT POWER-ON OPERATION MOTHERBOARD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 219 days.

(21) Appl. No.: 14/687,559

(22) Filed: Apr. 15, 2015

(65) Prior Publication Data

US 2016/0154385 A1 Jun. 2, 2016

(30) Foreign Application Priority Data

Nov. 28, 2014 (CN) .......................... 2014 1 0701323

(51) Int. Cl.
*H02J 1/00* (2006.01)
*G05B 9/02* (2006.01)

(52) U.S. Cl.
CPC ..................... *G05B 9/02* (2013.01)

(58) Field of Classification Search
CPC ....................................... G05B 9/02
USPC ........................................... 307/86
See application file for complete search history.

(56) References Cited

U.S. PATENT DOCUMENTS

| | | | | |
|---|---|---|---|---|
| 2004/0174992 | A1* | 9/2004 | Apfel | H04M 19/00 379/413 |
| 2011/0107122 | A1* | 5/2011 | Wang | H02J 1/102 713/300 |
| 2012/0280617 | A1* | 11/2012 | Josefowicz | H05B 33/0815 315/85 |
| 2015/0049072 | A1* | 2/2015 | Eggert | G09G 3/006 345/211 |
| 2015/0155700 | A1* | 6/2015 | Alvarez Valenzuela | H03K 17/0822 361/93.9 |

* cited by examiner

*Primary Examiner* — Jared Fureman
*Assistant Examiner* — Duc M Pham
(74) *Attorney, Agent, or Firm* — Steven Reiss

(57) ABSTRACT

A protection circuit to prevent power-on operations for a motherboard includes a first power supply, a spring mechanical switch attached to a chassis of an electronic device, a plurality of second power supplies with different voltages, and a plurality of electronic switches. The spring mechanical switch includes a first terminal coupled to the first power supply, and a second terminal grounded. First pins of the electronic switches are coupled to the first terminal, second pins of the electronic switches respectively are coupled to the second power supplies, third pins of the electronic switches are capable of powering the motherboard. When the cover is detached from the chassis, the mechanical switch rebounds, the first terminal disconnects and the second terminal are disconnected, the electronic switches are turned off, no voltages output from the third pins of the electronic switches.

10 Claims, 1 Drawing Sheet

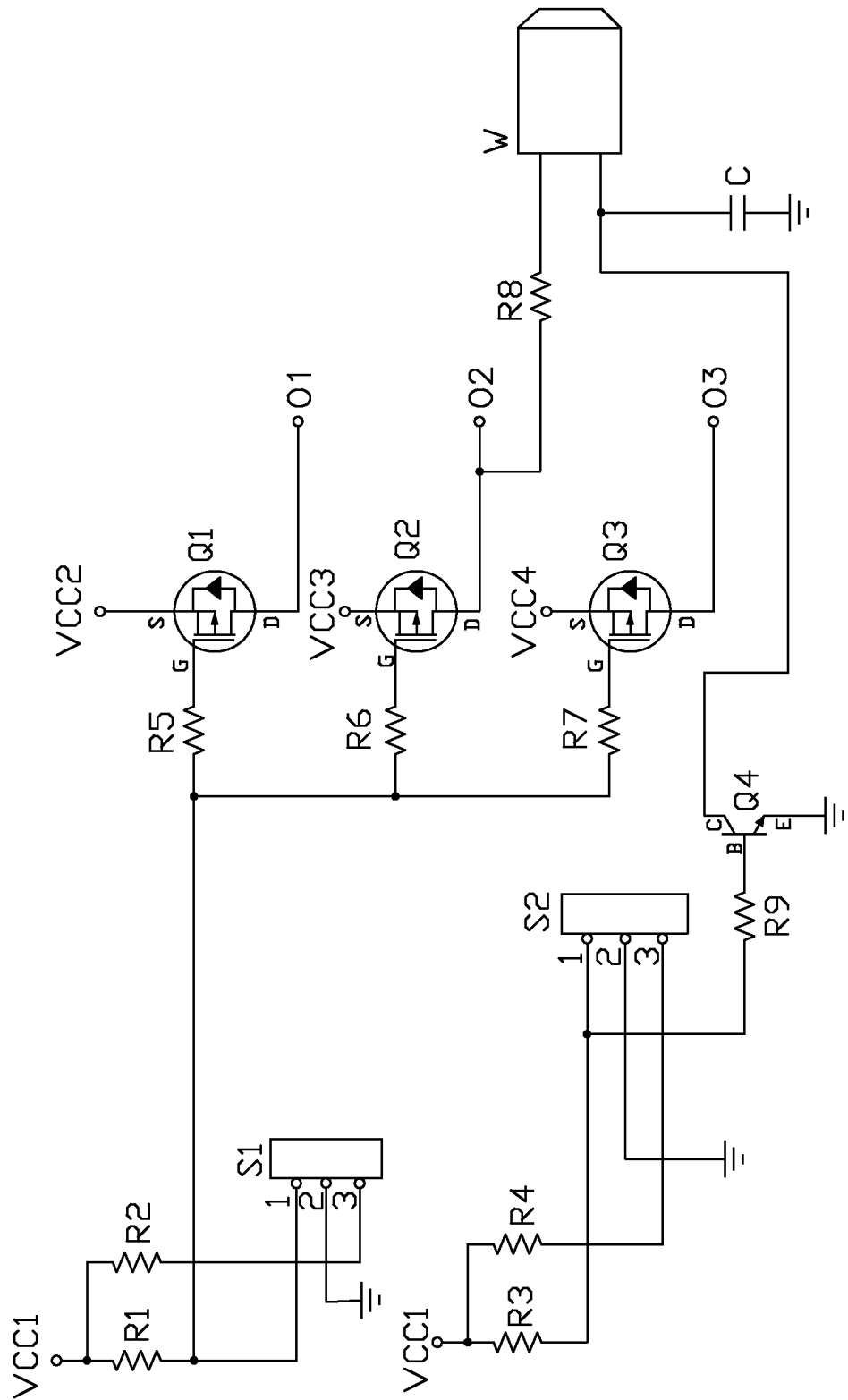

PROTECTION CIRCUIT TO PREVENT POWER-ON OPERATION MOTHERBOARD

FIELD

The subject matter herein generally relates to protection circuits, and particularly to a protection circuit to prevent power-on operation a motherboard.

BACKGROUND

To maintain an electronic device, a cover can be detached from a chassis of the electronic device. Then, electronic components, such as CPU, memory cards, are often installed or removed from a motherboard of the electronic device without first disconnecting power supplies from the motherboard, which may cause harm to the motherboard.

BRIEF DESCRIPTION OF THE DRAWING

Implementations of the present technology will now be described, by way of example only, with reference to the attached FIGURE.

The FIGURE is a circuit diagram of a protection circuit to prevent power-on operation motherboard.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The FIGURE illustrates an embodiment of a protection circuit to prevent power-on operation a motherboard of an electronic device (not shown). The electronic device comprises a chassis receiving the motherboard therein, and a cover detachably covering the chassis. The protection circuit comprises electronic switches Q1-Q4, resistors R1-R9, spring mechanical switches S1-S2, a warning member W, a capacitor C, and power supplies VCC1-VCC4. In the embodiment, the electronic switch Q4 can be an npn-type bipolar junction transistor (BJT), the electronic switch Q1-Q3 can be p-channel metal-oxide semiconductor field-effect transistors (PMOSFETs). In the embodiment, the power supply VCC1 is 3V battery, the power supply VCC2 is a 12V direct current voltage, the power supply VCC3 is a 5V direct current voltage, and the power supply VCC4 is a 3.3V direct current voltage. In the embodiment, the warning member W is a buzzer.

Each of the spring mechanical switches S1 and S2 is attached to the chassis and comprises a first terminal 1, a second terminal 2 grounded, and a third terminal 3. In an original state, the first terminal 1 and the second terminal 2 of each of the spring mechanical switches S1 and S2 are disconnected. When the spring mechanical switches S1 and S2 are pressed, the first terminal 1 and the second terminal 2 of each of the spring mechanical switches S1 and S2 are connected.

The first terminal 1 of the spring mechanical switch S1 is connected to the power supply VCC1 through the resistor R1. The third terminal 3 of the spring mechanical switch S1 is connected to the power supply VCC1 through the resistor R2. The first terminal 1 of the spring mechanical switch S1 is also connected to a gate of the electronic switch Q1 through resistor R5. The source of the electronic switch Q1 is connected to the power supply VCC2. The drain of the electronic switch Q1 is connected to an output end O1.

The first terminal 1 of the spring switch S1 is also connected to the gate of the electronic switch Q2 through resistor R6. The source of the electronic switch Q2 is connected to the power supply VCC3. The drain of the electronic switch Q1 is connected to an output end O2. The output end O2 is connected to an anode of the warning member W through the resistor R8.

The first terminal 1 of the spring switch S1 is also connected to the gate of the electronic switch Q3 through resistor R7. The source of the electronic switch Q3 is connected to the power supply VCC4. The drain of the electronic switch Q3 is connected to an output end O3. The output ends O1-O3 can power the motherboard.

The first terminal 1 of the spring switch S2 is connected to the power supply VCC1 through the resistor R3. The third terminal 3 of the spring switch S2 is connected to the power supply VCC1 through the resistor R4. The first terminal 1 of the spring switch S2 is also connected to the base of the electronic switch Q4 through resistor R9. The collect of the electronic switch Q4 is connected to a cathode of the warning member W. The cathode of the warning member W is also grounded through the capacitor C, for filtering noises. The emitter of the electronic switch Q4 is grounded.

When the cover covers the chassis, the spring mechanical switches S1 and S2 are pressed. The first terminal 1 and second terminal 2 of the spring mechanical switch S1 are connected and grounded, the electronic switches Q1-Q3 are turned on, and the output ends O1-O3 respectively output a 12V voltage, a 5V voltage, a 3.3V voltage to the motherboard. The first terminal 1 and second terminal 2 of the spring mechanical switch S2 are connected and grounded, the electronic switch Q4 is turned off, the warning member W does not work.

When the cover is detached from the chassis, the spring mechanical switches S1 and S2 rebound to their original states. The first terminal 1 and second terminal 2 of the spring mechanical switch S1 are disconnected, the electronic switches Q1-Q3 are turned off, the output ends O1-O3 do not output voltages. The first terminal 1 and second terminal 2 of the spring mechanical switch S2 are disconnected, the electronic switch Q4 is turned on. Being the anode of the warning member W is not powered, the warning member W does not work. Users can operate the motherboard in a power-off situation.

When the cover is detached from the chassis, and the motherboard is required to work, the spring mechanical switch S1 can be pressed manually and the spring mechanical switch S2 keeps its original state. The first terminal 1 and second terminal 2 of the spring mechanical switch S1 are connected, the electronic switches Q1-Q3 are turned on, the output ends O1-O3 respectively output a 12V voltage, a 5V voltage, a 3.3V voltage to the motherboard. The anode of the warning member W receives a 5V voltage. The first terminal and second terminal of the spring mechanical switch S2 are disconnected, the electronic switch Q4 is turned off, the cathode of the warning member W is grounded. The warning member W warns to inform Users who operate the motherboard in a power-on situation. At this time, if the User does not want to hear the warnings, the spring mechanical switch S2 can be pressed manually, the electronic switch Q4 is turned off and the warning member W stops.

When the cover is detached from the chassis, and the motherboard and the warning member W are required not to work, the spring mechanical switch S2 keep its original state and the spring mechanical switch S1 is pressed manually. The first terminal 1 and second terminal 2 of the spring mechanical switch S1 are disconnected, the electronic switches Q1-Q3 are turned off, the output ends O1-O3 do not output voltages to the motherboard. The electronic switch Q4 is turned off. The anode of the warning member W is not powered. The warning member W does not work.

The protection circuit can stop to output voltages to the motherboard when the cover is detached from the chassis, and can inform users who operate the motherboard in a power-on situation.

The embodiments shown and described above are only examples. Many details are often found in the art such as the other features of the protection circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A protection circuit for an electronic device comprising:
    a first power supply;
    a spring mechanical switch attached to a chassis of the electronic device;
    a plurality of second power supplies with different voltages; and
    a plurality of electronic switches;
    wherein the spring mechanical switch comprises a first terminal coupled to the first power supply and a second terminal that is grounded; first pins of the electronic switches are coupled to the first terminal; second pins of the electronic switches are respectively coupled to the second power supplies; and third pins of the electronic switches are capable of powering a motherboard of the electronic device;
    when a cover of the electronic device covers the chassis, the spring mechanical switch is pressed and the first terminal and the second terminal are connected, the electronic switches are turned on, and the third pins of the electronic switches output voltages to the motherboard;
    when the cover is detached from the chassis, the mechanical switch rebounds, the first terminal disconnects and the second terminal are disconnected, the electronic switches are turned off, and no voltages output from the third pins of the electronic switches.

2. The protection circuit of claim 1, wherein the second power supplies comprises a 12V direct current voltage, a 5V direct current voltage, and a 3.3V direct current voltage.

3. The protection circuit of claim 1, wherein the electronic switches are p-channel metal-oxide semiconductor field-effect transistors (PMOSFETs), each first pins is a gate, each the second pins is a drain, each third pins is a source.

4. The protection circuit of claim 1, wherein the first power supply is a 3V battery.

5. The protection circuit of claim 1, wherein one of the third pins of the electronic switches is coupled to an anode of a warning member, a second spring mechanic switch and a second electronic switch are connected between a cathode of the warning member and the first power supply.

6. The protection circuit of claim 5, wherein a first terminal of the second mechanical switch is coupled to the first power supply, a second terminal of the second mechanical switch is grounded, a first pin of the second electronic switch is connected the first terminal of the second mechanical switch, a second pin of the second electronic switch is connected the cathode of the warning member, a third pin of the second electronic switch is grounded, when the cover is detached, the first terminal and the second terminal of the second mechanical switch are disconnected and the warning member warns, when the cover covers the chassis, the first terminal and the second terminal of the second mechanical switch are connected, the second electronic switch is turned off, the warning member stops.

7. The protection circuit of claim 6, wherein the second electronic switch is an npn-type bipolar junction transistor (BJT), the first pins is a base, the second pin is a collect, the third pin is a source.

8. The protection circuit of claim 5, wherein the cathode of the warning member is grounded through a capacitor.

9. The protection circuit of claim 5, wherein the warning member is a buzzer.

10. A protection circuit for an electronic device comprising:
    a first power supply;
    a first spring mechanical switch and a second spring mechanical switch attached to a chassis of the electronic device;
    a plurality of second power supplies with different voltages;
    a plurality of first electronic switches;
    a second electronic switch; and
    a warning member;
    wherein each of the first and second spring mechanical switches comprises a first terminal coupled to the first power supply and a second terminal that is grounded; first pins of the first electronic switches are coupled to the first terminal of the first spring mechanical switch; second pins of the first electronic switches respectively coupled to the second power supplies; and third pins of the first electronic switches are capable of powering a motherboard of the electronic device;
    wherein a first pin of the second electronic switch is coupled to the first terminal of the second spring mechanical switch; a third pin of the second electronic switch is grounded, the warning member is coupled between a second pin of the second electronic switch and one of the third pins of the first electronic switches;

when a cover of the electronic device covers the chassis, the first and second spring mechanical switch are pressed, the first terminal and the second terminal of first mechanical switch are connected, the first terminal and the second terminal of second mechanical switch are connected, the first electronic switches are turned on, and the third pins of the electronic switches output voltages to the motherboard, the second electronic switch is turned off and the warning member stops;

when the cover is detached from the chassis, the first spring mechanical switch is pressed to power the motherboard, the warning member warns.

* * * * *